(12) United States Patent
Chowdhary et al.

(10) Patent No.: US 8,599,826 B2
(45) Date of Patent: *Dec. 3, 2013

(54) METHOD FOR SYNCHRONIZING DIRECT MODE TIME DIVISION MULTIPLE ACCESS (TDMA) TRANSMISSIONS

(75) Inventors: Dipendra M. Chowdhary, Hoffman Estates, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 277 days.

This patent is subject to a terminal disclaimer.

(21) Appl. No.: 12/760,787

(22) Filed: Apr. 15, 2010

(65) Prior Publication Data

US 2011/0255527 A1  Oct. 20, 2011

(51) Int. Cl.
*H04J 3/06* (2006.01)

(52) U.S. Cl.
USPC .......................................... 370/350; 370/509

(58) Field of Classification Search
USPC ......... 370/310, 345, 350, 464, 498, 503, 509, 370/510, 514; 455/39, 500, 501, 502
See application file for complete search history.

(56) References Cited

U.S. PATENT DOCUMENTS

| | | | |
|---|---|---|---|
| 4,698,805 A | 10/1987 | Sasuta et al. | |
| 5,020,130 A | 5/1991 | Grube et al. | |
| 5,179,720 A | 1/1993 | Grube et al. | |
| 5,226,045 A | 7/1993 | Chuang | |
| 5,287,551 A | 2/1994 | Gustafson, Jr. et al. | |
| 5,329,558 A | 7/1994 | Larsson et al. | |
| 5,519,710 A | 5/1996 | Otsuka | |
| 5,699,388 A | 12/1997 | Wang et al. | |
| 5,724,515 A | 3/1998 | Barnes et al. | |
| 5,734,643 A | 3/1998 | Rondeau | |
| 5,759,936 A | 6/1998 | Christiansen et al. | |
| 5,761,211 A | 6/1998 | Yamaguchi et al. | |
| 5,774,786 A | 6/1998 | Wirtjes et al. | |
| 5,905,965 A | 5/1999 | Asano et al. | |
| 6,052,557 A | 4/2000 | Kinnunen et al. | |
| 6,052,562 A | 4/2000 | Dorenbosch | |
| 6,061,568 A | 5/2000 | Dent | |
| 6,097,928 A | 8/2000 | Jeon | |
| 6,144,656 A | 11/2000 | Kinnunen et al. | |
| 6,169,728 B1 | 1/2001 | Perrault et al. | |
| 6,411,614 B1 | 6/2002 | Weigand | |

(Continued)

FOREIGN PATENT DOCUMENTS

| EP | 0689303 A1 | 12/1995 |
|---|---|---|
| EP | 0886451 A1 | 12/1998 |

(Continued)

OTHER PUBLICATIONS

"Electromagnetic Compatibility and Radio Spectrum Matters (ERM); Digital Mobile Radio (DMR) Systems; Part 1 : DMR Air Interface (A1) Protocol," ETSI TS 102 361-1, V1.4.5, Dec. 2007-2012.

(Continued)

*Primary Examiner* — Obaidul Huq
(74) *Attorney, Agent, or Firm* — Randi L. Karpinia; Daniel R. Bestor

(57) ABSTRACT

A method for synchronizing the direct mode TDMA transmission of a set of radios by following a selected radio as the leader includes: receiving, by a radio, a communication from an other radio; identifying, by the radio, a leader according to a leadership election rule using the received communication from the other radio and a current leader information; setting, by the radio, the identified leader as its leader; and synchronizing, by the radio, a time slot boundary with a time slot boundary defined by the leader.

13 Claims, 12 Drawing Sheets

(56) References Cited

U.S. PATENT DOCUMENTS

| | | | |
|---|---|---|---|
| 7,050,419 | B2 | 5/2006 | Azenkot et al. |
| 7,203,207 | B2 | 4/2007 | Hiben |
| 7,499,441 | B2 | 3/2009 | Wiatrowski et al. |
| 8,045,499 | B2 | 10/2011 | Waitrowski et al. |
| 8,139,597 | B2 | 3/2012 | Chowdhary et al. |
| 8,184,654 | B2 | 5/2012 | Patel et al. |
| 8,284,756 | B2 | 10/2012 | Tay |
| 8,385,299 | B2 | 2/2013 | Tay |
| 2002/0173311 | A1 | 11/2002 | Biggs et al. |
| 2003/0002456 | A1 | 1/2003 | Soomro et al. |
| 2003/0058925 | A1 | 3/2003 | Jechoux et al. |
| 2003/0076842 | A1* | 4/2003 | Johansson et al. ........... 370/401 |
| 2003/0153319 | A1 | 8/2003 | Wieczorek et al. |
| 2004/0196872 | A1 | 10/2004 | Nakamura |
| 2005/0068928 | A1* | 3/2005 | Smith et al. .................. 370/338 |
| 2005/0070320 | A1 | 3/2005 | Dent |
| 2005/0153666 | A1 | 7/2005 | Nguy et al. |
| 2005/0153723 | A1 | 7/2005 | Hosur et al. |
| 2005/0174963 | A1 | 8/2005 | Hsu |
| 2005/0277383 | A1 | 12/2005 | Reid |
| 2006/0013188 | A1 | 1/2006 | Wiatrowski et al. |
| 2006/0041680 | A1 | 2/2006 | Proctor, Jr. et al. |
| 2006/0198346 | A1* | 9/2006 | Liu et al. ....................... 370/338 |
| 2006/0221887 | A1 | 10/2006 | Newberg et al. |
| 2006/0234748 | A1 | 10/2006 | Baik |
| 2006/0245454 | A1* | 11/2006 | Balasubramanian et al. 370/509 |
| 2007/0104139 | A1 | 5/2007 | Marinier et al. |
| 2007/0129079 | A1 | 6/2007 | Schwarz et al. |
| 2007/0275756 | A1 | 11/2007 | Choi |
| 2008/0008153 | A1 | 1/2008 | Hiben et al. |
| 2008/0148360 | A1 | 6/2008 | Karstens |
| 2008/0151849 | A1 | 6/2008 | Utsunomiya et al. |
| 2008/0165759 | A1 | 7/2008 | Khoo et al. |
| 2008/0219191 | A1 | 9/2008 | Wang et al. |
| 2008/0225821 | A1 | 9/2008 | Faith |
| 2008/0232344 | A1* | 9/2008 | Basu et al. .................... 370/350 |
| 2009/0016283 | A1 | 1/2009 | Zhang et al. |
| 2009/0016321 | A1 | 1/2009 | Li et al. |
| 2009/0034432 | A1* | 2/2009 | Bonta et al. ................... 370/255 |
| 2009/0046763 | A1 | 2/2009 | Kerai |
| 2009/0059877 | A1 | 3/2009 | Utsunomiya et al. |
| 2009/0219916 | A1 | 9/2009 | Bohn |
| 2009/0290511 | A1* | 11/2009 | Budampati et al. ........... 370/254 |
| 2009/0310570 | A1 | 12/2009 | Smith |
| 2010/0029230 | A1 | 2/2010 | Linsky |
| 2010/0086092 | A1 | 4/2010 | Wiatrowski et al. |
| 2010/0087142 | A1 | 4/2010 | Panpaliya et al. |
| 2010/0279726 | A1 | 11/2010 | Bohn et al. |
| 2010/0303033 | A1 | 12/2010 | Shahar et al. |
| 2011/0026514 | A1 | 2/2011 | Tay |
| 2011/0096747 | A1 | 4/2011 | Seok |
| 2011/0216746 | A1 | 9/2011 | Tay |
| 2011/0218008 | A1 | 9/2011 | Sim et al. |
| 2012/0135765 | A1 | 5/2012 | Khoo et al. |
| 2012/0327928 | A1 | 12/2012 | Wiatrowski et al. |

FOREIGN PATENT DOCUMENTS

| | | | |
|---|---|---|---|
| EP | 0991216 | A2 | 4/2000 |
| EP | 1389025 | A1 | 2/2004 |
| EP | 0976165 | A2 | 10/2008 |
| GB | 2271690 | A | 4/1994 |
| GB | 2409129 | A | 6/2005 |
| KR | 10-0349664 | B1 | 8/2002 |
| KR | 10-2008-0021454 | A | 3/2008 |
| WO | 2005107098 | A1 | 11/2005 |
| WO | 2006087265 | A1 | 8/2006 |
| WO | 2007036111 | A | 4/2007 |

OTHER PUBLICATIONS

Ex Parte Quale Office Action mailed on Jun. 24, 2011, in U.S. Appl. No. 12/331,137, David G. Wiatrowski, filed Dec. 9, 2008.
International Preliminary Report on Patentability for International Application No. PCT/US2009/058545 mailed on Apr. 14, 2011.
International Preliminary Report on Patentability for International Application No. PCT/US2009/058548 mailed on Apr. 14, 2011.
International Preliminary Report on Patentability for related Patent Application No. PCT/US2009/058550 mailed on Apr. 14, 2011.
International Search Report and Written Opinion for related International Application No. PCT/U52009/058545 mailed on Apr. 30, 2010.
International Search Report and Written Opinion for related International Application No. PCT/U52009/058550 mailed on Apr. 30, 2010.
International Search Report and Written Opinion for related International Application No. PCT/US2009/058548 mailed on Apr. 15, 2010.
International Search Report and Written Opinion for related International Application No. PCT/US2011/29700 mailed on Nov. 25, 2011.
Non Final Office Action mailed on Apr. 22, 2011, in related U.S. Appl. No. 12/331,155, Tejal S. Patel, filed Dec. 9, 2008.
Non Final Office Action mailed on Dec. 28, 2011, in related U.S. Appl. No. 12/331,167, Satish R. Panpaliya, filed Dec. 9, 2008.
Non Final Office Action mailed on May 27, 2011, in related U.S. Appl. No. 12/331,180, Dipendra M. Chowdhary, filed Dec. 9, 2008.
Non Final Office Action mailed on Oct. 4, 2011, in related U.S. Appl. No. 12/331,189, David G. Wiatrowski, filed Dec. 9, 2008.
Notice of Allowance mailed on Aug. 8, 2011, in U.S. Appl. No. 12/331,137, David G. Wiatrowski, filed Dec. 9, 2008.
Notice of Allowance mailed on Dec. 14, 2011, in related U.S. Appl. No. 12/331,155, Tejal S. Patel, filed Dec. 9, 2008.
Notice of Allowance mailed on Nov. 7, 2011, in related U.S. Appl. No. 12/331,180, Dipendra M. Chowdhary, filed Dec. 9, 2008.
Supplementary European Search Report for European Application No. 09818328, European Patent Office, The Hague, Netherlands, mailed on Mar. 6, 2012.
Supplementary European Search Report for European Application No. 09818326, European Patent Office, The Hague, Netherlands, mailed on Feb. 27, 2012.
Choon Geun Cho, Application PCT/US2009/058326—PCT International Search Report and Written Opinion, WIPO, ISA/KR, Korean Intellectual Property Office, Daejeon, Republic of Korea, May 10, 2010, 10 pages, most relevant pp. 6-7 and 10 for related U.S. Appl. No. 12/331,189.
PCT Notification Concerning Transmittal of International Preliminary Report on Patentability Dated Apr. 14, 2011 for Related U.S. Appl. No. 12/331,189.
PCT International Search Report Dated Mar. 3, 2011.
Office Action Dated Apr. 20, 2012 for Related U.S. Appl. No. 12/761,023.
European Extended Search Report Dated Mar. 1, 2012 for Related Application PCT/US2009/058545.
Notice of Allowance mailed on Jul. 6, 2012 in U.S. Appl. No. 12/331,189, David G. Wiatrowski, filed Dec. 9, 2008.
Notice of Allowance mailed on May 18, 2012 in U.S. Appl. No. 12/331,189, David G. Wiatrowski, filed Dec. 9, 2008.
Notice of Allowance mailed on Apr. 5, 2012 in U.S. Appl. No. 12/331,155, Tejal S. Patel, filed Dec. 9, 2008.
Final Office Action mailed on Jul. 19, 2012 in U.S. Appl. No. 12/331,167, Satish R. Panpaliya, filed Dec. 9, 2008.
Notice of Allowance mailed on Sep. 18, 2012, in U.S. Appl. No. 12/761,023, Thomas B. Bohn, filed Apr. 15, 2010.
International Preliminary Report on Patentability and Written Opinion for International Patent Application No. PCT/US2010/062117 mailed on Oct. 16, 2012.
International Search Report and Written Opinion for International Patent Application No. PCT/US2012/025795 mailed on Aug. 17, 2012.
Extended European Search Report for counterpart European Patent Application No EP 121882170 issued on Jan. 11, 2013.
English language translation of Office Action issued on Nov. 27, 2012in related counterpart Korean Patent Application No. 10-2011-7007655.
English language translation of Office Action issued on Jan. 18, 2013 in related counterpart Australian Patent Application No. 2009298799.

(56) References Cited

OTHER PUBLICATIONS

English language translation of Office Action issued on Jan. 8, 2013 in related counterpart Australian Patent Application No. 2009298764.

Non Final Office Action mailed Jan. 16, 2013 in related U.S. Appl. No. 12/761,023, Thomas B. Bohn, filed Apr. 15, 2010.

Notice of allowance mailed on Feb. 5, 2013 in related U.S. Appl. No. 13/575,902, filed on Jul. 25, 2012.

International Preliminary Report on Patentability and Written Opinion for International Patent Application No. PCT/US2011/029700 dated Oct. 16, 2012.

Notice of Allowance mailed on Nov. 9, 2012 in U.S. Appl. No. 12/331,167, Satish R, Panpaliya, filed Dec. 9, 2008.

Notice of Allowance mailed Jun. 7, 2013 in U.S. Appl. No. 12/761,023, Thomas B. Bohn, filed Apr. 15, 2010.

Office Action mailed Oct. 31, 2012 in European Patent Application No. 09818325.4.

Notice of Allowance mailed Apr. 19, 2013 in U.S. Appl. No. 13/042,342, David G. Wiatrowski, filed Mar. 7, 2011.

Notice of Allowance mailed Apr. 3, 2013 in U.S. Appl. No. 13/557,903, Dipendra M. Chowdhary, filed Jul. 25, 2012.

\* cited by examiner

METHOD FOR SYNCHRONIZING DIRECT MODE TIME DIVISION MULTIPLE ACCESS (TDMA) TRANSMISSIONS

FIELD OF THE DISCLOSURE

The present disclosure relates generally to wireless communications and more particularly to direct mode synchronization in a time division multiple access (TDMA) system.

BACKGROUND

The European Telecommunications Standard Institute-Digital Mobile Radio (ETSI-DMR) is a direct digital replacement for analog Private Mobile Radio (PMR). DMR is a scalable system that can be used in unlicensed mode (in a 446.1 to 446.2 MHz band), and in licensed mode, subject to national frequency planning. Any of the ETSI standards or specifications referred to herein may be obtained by contacting ETSI at ETSI Secretariat, 650, route des Lucioles, 06921 Sophia-Antipolis Cedex, FRANCE.

DMR promises improved range, higher data rates, more efficient use of spectrum, and improved battery. Features supported include fast call set-up, calls to groups and individuals, short data and packet data calls. The communications modes include individual calls, group calls, and broadcast calls provided via a direct communication mode among the radios operating within the network. Other important DMR functions such as emergency calls, priority calls, full duplex communications, short data messages and Internet Protocol (IP)-packet data transmissions are supported.

Direct mode is a mode of operation where radios may communicate within a network without the assistance of one or more infrastructure equipment. A radio, as used herein, can be mobile and/or fixed end equipment that is used to obtain DMR services. Direct mode is a communication technique where any radio can communicate with one or more other radios without the need for any additional infrastructure equipment (e.g. base stations or repeaters). Direct mode operation is in contrast to the conventional repeater mode which is a mode of operation where radios communicate through infrastructure equipment such as a repeater. Direct mode, therefore, can provide a more efficient, less costly communication system operation than repeater mode operation.

The European Telecommunications Standard Institute-Digital Mobile Radio (ETSI-DMR) standard provides for 6.25e (2:1 TDMA) operation in repeater mode. 6.25e (2:1 TDMA) operation refers to 6.25 Kilohertz (kHz) equivalent spectral efficiency. As there is no restriction on what happens in neither each time slot nor any interrelation between them (other than the need to maintain time synchronicity), it is therefore possible to have two entirely separate conversations at the same time from two different units. By this means it is possible that two simplex calls can be independently supported in a single 12.5 kHz channel. Secondly, this means that DMR devices fitted with this protocol will also comply with the North American requirements for 6.25 kHz channel equivalence.

In contrast, the present ETSI-DMR standard only provides for 12.5 Kilohertz (KHz) operation in talkaround mode (systems that primarily use a repeater and occasionally communicate without a repeater) and direct mode (systems that exclusively communicate without a repeater). 12.5 KHz operation refers to 12.5 KHz spectral efficiency in which there is only one communication path per 12.5 KHz of radio frequency (RF) spectrum.

Both 6.25e repeater mode and 12.5 talkaround/direct mode utilize 27.5 millisecond (msec) pulsed (every 60 msec) radio transmissions. In the 6.25e repeater mode of operation, the repeater defines the TDMA time slot boundaries on the channel and the radios synchronize themselves to the repeater for transmitting and receiving. The radios' transmissions are pulsed. The repeaters transmit a continuous signal divided into time slots. In the 12.5 talkaround/direct mode of operation, radios transmit asynchronously and radios within range of the transmission synchronize themselves to that transmission for the purposes of receiving the transmission, but any transmissions in response to the first transmission are transmitted asynchronously.

Accordingly, there is a need to support more spectrally efficient direct mode, specifically, 2:1 TDMA or 6.25e direct mode. To support this, all radios need to be synchronized to use a common channel timeslot structure. Therefore, there is a need for synchronizing direct mode TDMA transmissions in a wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
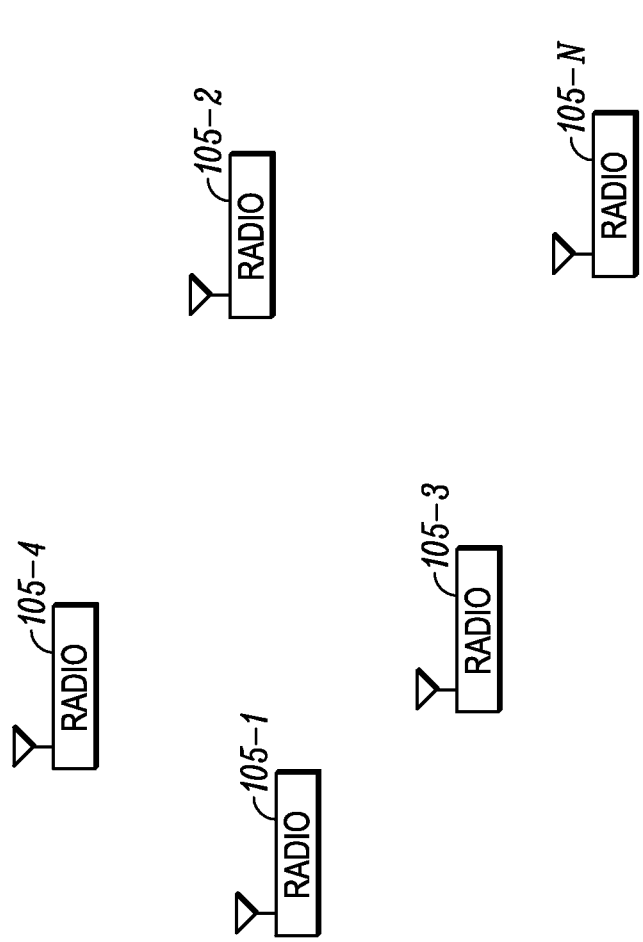
FIG. 1 is a block diagram of an illustrative wireless communications system operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for synchronizing the direct mode TDMA transmission of a set of radios by following a selected radio as the leader is provided herein. One objective of this method is to synchronize radios that are not close enough to communicate directly.

The method for synchronizing direct mode time division multiple access (TDMA) transmissions includes: receiving, by a radio, a communication from an other radio; identifying, by the radio, a leader according to a leadership election rule using the received communication from the other radio and a current leader information; setting, by the radio, the identified leader as its leader; and synchronizing, by the radio, a time slot boundary with a time slot boundary defined by the leader.

Referring now to FIG. 1, an example of a wireless communications system 100 comprising a plurality of radios 105-n operating in accordance with some embodiments is illustrated. Radios 105-1 through 105-n communicate with each other on direct mode radio frequencies without communicating through any infrastructure, for example, a repeater. The radios 105-n all operate on direct mode radio frequencies. It will be appreciated by those of ordinary skill in the art that in some embodiments the frequency could also have repeaters on it, but radios 105-n are not using those repeaters (e.g., the repeaters could belong to a different system). (not shown)

A radio, as used herein, can be mobile and/or fixed end equipment that is used to obtain DMR services. For example, a radio can be a mobile radio (i.e. a portable radio, a mobile station, a subscriber unit, a mobile subscriber), or can be a fixed station (i.e. a fixed control station, a base station, and any supporting equipment such as wireline consoles and packet data switches). Each radio is capable of communicating directly with one or more other radios using TDMA techniques as further described herein, in which specified time segments are divided into assigned time slots for individual communications. In some embodiments, one or more radio is further capable of communicating with infrastructure equipment such as a repeater (not shown). Each radio frequency (RF) in the system carries time slots whereby each time slot is known as a "channel."

For ease of describing the embodiments hereinafter, the wireless communications system 100 is presumed to be a two time slot TDMA communications system. Thus, in the embodiments described below, since there are two time slots, there are two channels available on each radio frequency for carrying the traffic of the system. A time slot is an elementary timing of the physical channel. For example, in one embodiment, a time slot has a length of thirty milliseconds (30 ms) and is numbered "1" or "2". It is important to note, however, that the TDMA communication system may have other slot lengths and slotting ratios, as well, and still remain within the spirit and scope of the present disclosure. Thus, the present invention is applicable to any TDMA communication system that has a slotting ratio that is n:1, where n is an integer greater than 1.

Figure 2:
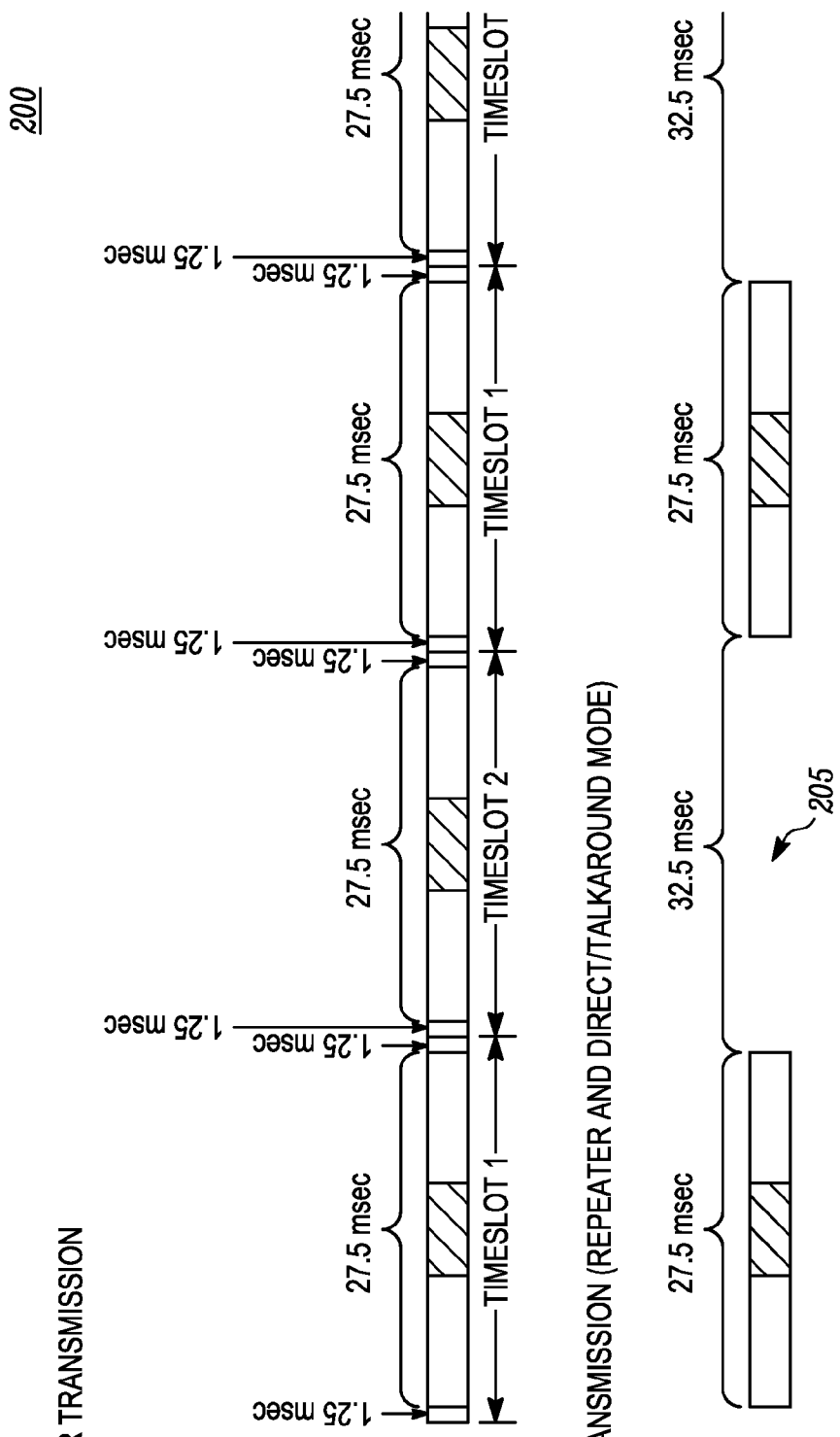
FIG. 2 is a message transmission diagram illustrating one embodiment of the operation of various devices of a wireless communication system.

As discussed previously herein, and illustrated further in the transmission diagram 200 of FIG. 2, within the present ETSI-DMR systems, in the 12.5 KHz talkaround/direct mode of operation, radios transmit asynchronously (because there is no common time slot reference available) and radios within range of the transmission synchronize themselves to that transmission for the purposes of receiving the transmission, but any transmissions in response to the first transmission are transmitted asynchronously. There is presently no attempt to make use of the unused 32.5 msec portion 205 of the channel.

Figure 3:
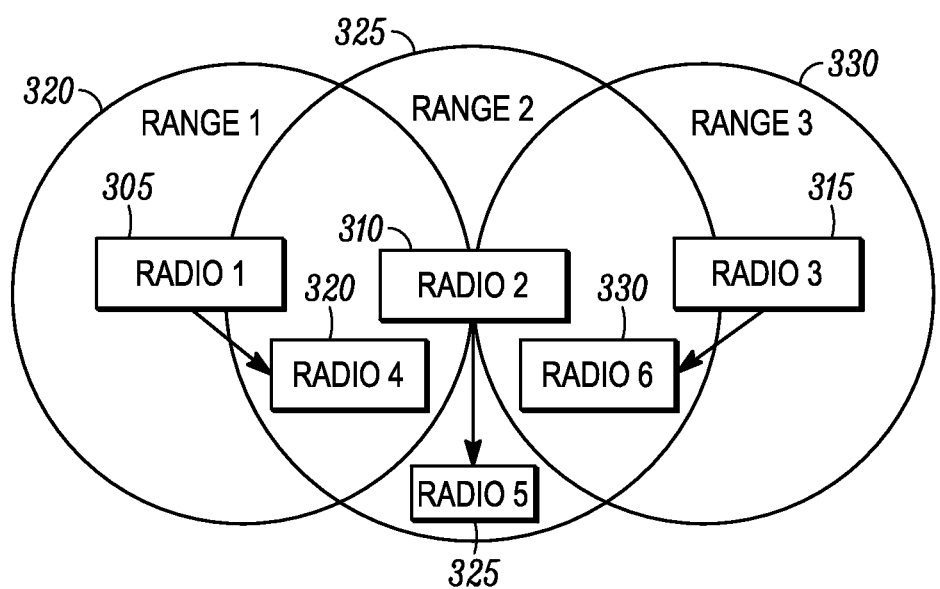
FIG. 3 illustrates a network scenario in which implementation of some embodiments can be utilized.

The difficulty with using the unused 32.5 msec portion of the channel is that there is no global time slot boundary reference available. To illustrate the problem, consider the network scenario 300 as illustrated in FIG. 3. In the network scenario 300 of FIG. 3, radio 1 (305) and radio 3 (315) are not within range of each other (i.e. range 1 (320) does not overlap with range 3 (330)). It will be appreciated by those of ordinary skill in the art that in another scenario (not shown) range 1 (320) could partially overlap with range 3 (330) while radio 1 (305) and radio 3 (315) are still not in range of each other. Further, radio 1 (305) and radio 3(315) in the network scenario 300 are each transmitting in what they independently consider to be time slot 1, most likely using different time slot boundaries (determined randomly and independently). For example, in this scenario, radio 1 (305) is transmitting to radio 4 (320) in time slot 1; and radio 3 (315) is transmitting to radio 6 (330) on time slot 1. Radio 2 (310) is within range of both radio 1 (305) and radio 3 (315) (i.e. range 2 (325) overlaps with range 1 (320) and range 3 (330) and radio 2 (310) desires to transmit to radio 5 (325) in time slot 2.

Figure 4A:
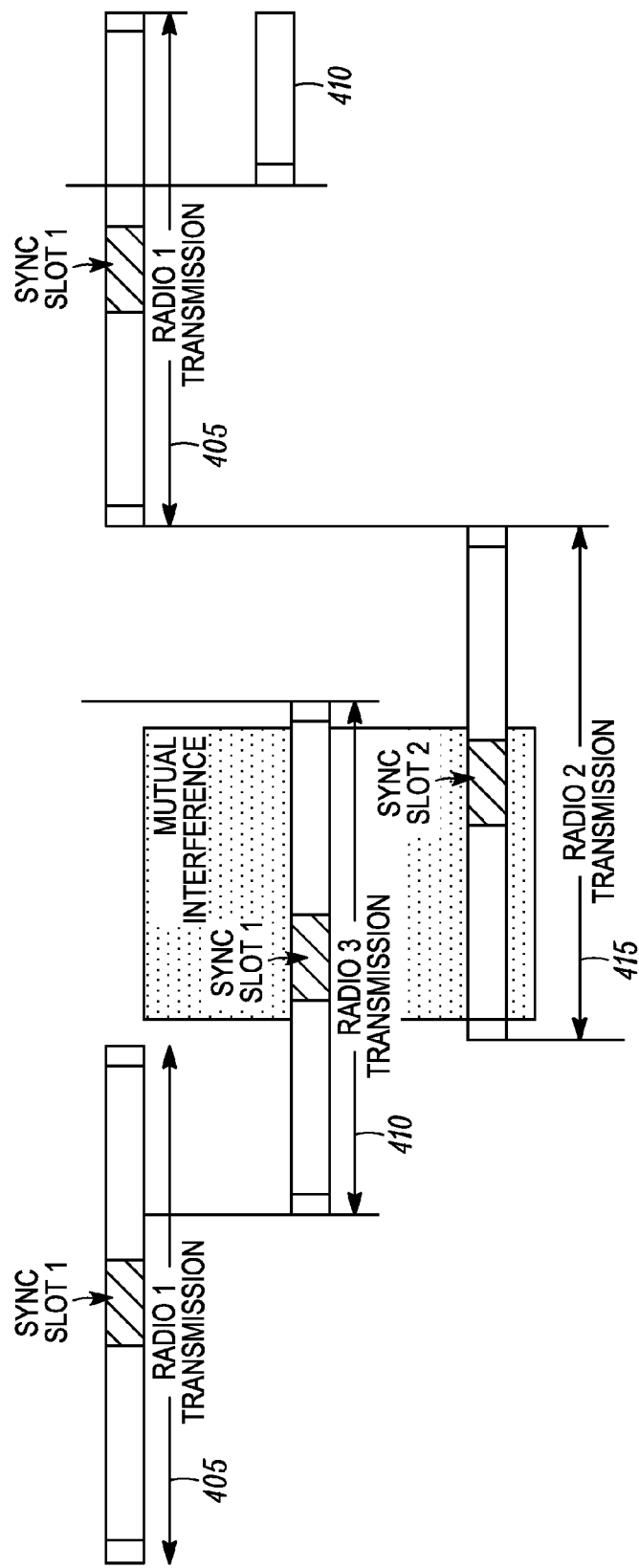
FIGS. 4A and 4B are message transmission diagrams illustrating transmissions of some of the radios in the network scenario of FIG. 2.

Referring to the transmission timing diagram of FIG. 4A, as described previously, radio 1 (305) is transmitting (405) in time slot 1 and radio 3 (315) is also transmitting (410) in time slot 1. However, radio 1's transmissions (405) and radio 3's transmissions (315) are not aligned. Radio 2 (310) could synchronize itself to either radio 1's (305) transmission 405 or radio 3's (315) transmission 410 and then transmit in what it believes to be the unused portion of the channel. One drawback of this approach is, as illustrated, that if, for example, radio 2 (310) is able to synchronize to radio 1's (305) transmission 405, then its transmission (415) and radio 3's transmission (410) will mutually interfere as viewed (or received) by radios 5 (325) and 6 (330). Similarly, if radio 2 (310) is able to synchronize to radio 3's (315) transmission 410 (not shown), then its transmission and radio 1's transmission (405) will mutually interfere as viewed (or received) by radios 4 (320) and 5 (325). Both situations are highly undesirable and may result in the corruption of radio 1's, radio 2's, and/or radio 3's transmissions. Therefore, in the scenario of FIG. 4A, there may be only one successful transmission: transmission 405 from radio 1 (305) to radio 4 (320).

Figure 4B:
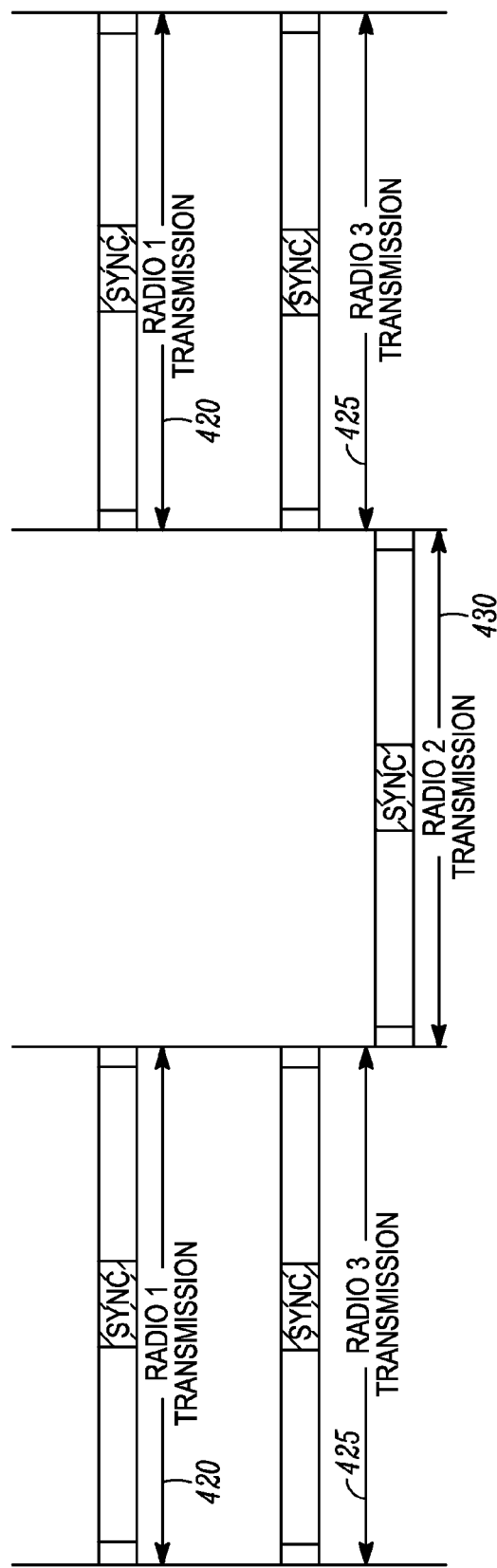

As illustrated in FIG. 4B, the objective is to have radio 1's (305) transmission 420 and radio 3's (315) transmission 425 aligned to a common time slot boundary reference, despite them not knowing anything about the other's presence. As illustrated in FIG. 4B, radio 1 (305) and radio 3 (315) are both transmitting on time slot 1, but are aligned. In FIG. 4B, radio 2 (310) aligns to radio 1 (305) because it can hear radio 1's transmissions (420); and is able to make a transmission 430 in time slot 2 without corrupting the transmissions emanating from radio 1 (305) and radio 3 (315). Alternatively, (not shown) radio 2 (310) can align to radio 3 (315) because it also can hear radio 3's transmissions (425); and is able to make a transmission 430 in time slot 2 without corrupting the transmissions emanating from radio 1 (305) and radio 3 (315). Therefore, in the scenario of FIG. 4B, there will be three successful transmissions including transmission 420 from radio 1 (305) to radio 4 (320), transmission 430 from radio 2 (310) to radio 5 (325), and transmission 425 from radio 3 (315) to radio 6 (330).

Figure 5:
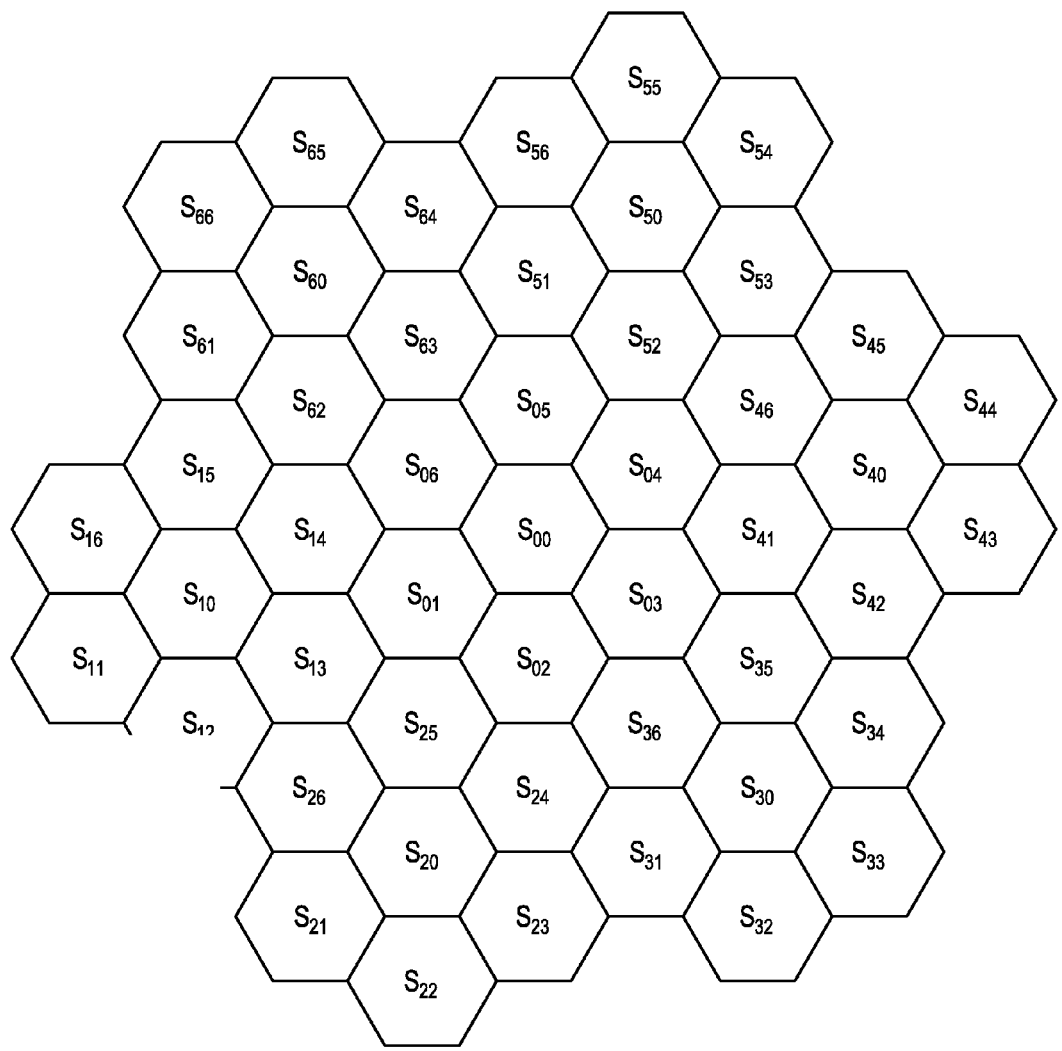
FIG. 5 illustrates a network of radios in which implementation of some embodiments can be utilized.

Solving the problem illustrated above becomes much more crucial when a much larger network of radios is considered. Each licensed service area is allocated to zero or more agencies by regulatory bodies, so co-channel users may be encountered within a service area and between adjacent service areas. In FIG. 5, each cell ($S_{xy}$) represents a licensed service area comprising a multiplicity of radios all operating on the same frequency. Part of the challenge is that all or a subset of radios in the wide region of operation may be mobile. Over time, radios come into and go out of range of each other, unpredictably. Radios operating within a cell (i.e., $S_{00}$) are most likely to be in direct communication with each other, radios operating in adjacent cells (i.e., cells adjacent to $S_{00}$ are $S_{0y}$) are less likely to be in direct communication with radios located in cell $S_{00}$, and radios operating in further out cells (i.e., cells further out from $S_{00}$ are $S_{xy;\ x>0}$) are least likely to be in direct communication with radios located in cell $S_{00}$. Nonetheless, all radios are ultimately affected by time slot boundaries being used in all areas of the wide region and would benefit by a common time slot boundary reference.

For a 6.25e direct mode solution to function correctly, all radios over the wide region of operation must use the same time slot boundaries; therefore, a method of providing a global time slot boundary reference is needed to enable 6.25e direct mode operation.

In the operation described hereinafter, a unique radio is elected as a leader in a distributed manner. Each non-leader radio adjusts its clock based on messages received from other radios, taking into consideration that a radio that has recent contact with the leader has more effect on the adjustment than a radio that has older contact with the leader. The approach retains the resilience of a fully distributed peer-to-peer synchronization with the stability guarantee of a hierarchical synchronization method.

Leader Election Mechanism

Leadership election as described herein below is suitable for synchronizing a set of radios, where not all the radios are in the immediate coverage area of each other and every radio does not need to know that every radio knows the new leader.

Exactly one of the radios in a system is the correct leader at any time. In the steady-state case, all of the radios have discovered the identity of the unique correct leader. Transient states may exist where either (i) only a subset of the radios agree on the identity of the unique correct leader, or (ii) the old correct leader has failed, and no radio has taken over the leadership yet. A leader plays a role that is similar to a stratum-1 clock, in the sense that it does not adjust its clock based on the message received (except when the leader first joins a system). The other radios adjust their clocks in order to remain as synchronized as possible with the leader.

As illustrated in FIGS. 6-10, leadership determination in accordance with the embodiments described herein is an ongoing distributed process. In accordance with some embodiments, each radio within the system is preprogrammed with a predetermined leadership election rule. The leadership election rule can comprise, for example, selecting the radio with the highest identification (ID) as the leader, selecting the radio with the lowest identification (ID) as the leader, or selecting the radio with the highest provisioned leader priority attribute as the leader. A leader priority attribute, for example, could be set higher for fixed radios, control stations, base stations, and the like who are better leader candidates than mobile radios because the better leader candidates are stationary, transmit with a larger effective radiated power (ERP), or with an antenna mounted very high in the air (i.e., Height Above Average Terrain (HAAT)). Alternatively, the leadership election rule can comprise a calculation taking into account one or more of the radio's ID, the provisioned color code, and provisioned time slot. For example, a leader metric could be formed by concatenating the radio's provisioned identification into the most significant bits, the provisioned color code into the next most significant bits, and the provisioned time slot into the least significant bits comprising the leader metric. A radio then compares its leader metric with other radios' leader metric to determine which radio should assume the role of leader for the RF (radio frequency) channel.

In a steady state condition, when a radio receives synchronization (sync) information from the leader, it accepts the new clock of the leader, which is guaranteed to be more up-to-date than that of the radio, because it comes from the leader itself. In addition to channel time slot boundary information, every radio tracks at least two pieces of information explicitly exchanged: the radio it believes is the current leader and an indication (SyncAge) of how long it has been since it has received a timing update from that leader. Each radio also stores knowledge of the time slot boundaries defined by the leader which are implicitly defined by the location of a received synchronization word. When a radio is not a direct neighbor of the leader, it first checks whether the received SyncAge is more up-to-date than its own. This check is only required if the receiving radio did not change its leader ID. If not, the source clocks are not comparable, and the clock of the new leader should be accepted unconditionally.

The operation illustrated in FIGS. 6 through 10 herein below, comprises a procedure for handling synchronization information which is used whenever a radio B receives synchronization (sync) information from a neighbor radio A. The radio B computes new sync information from its current sync information and the received sync information. The procedure provides for the propagation of leadership information including Leader ID and SyncAge for synchronizing radio B's clock with the received sync information's clock.

It will be appreciated for purposes of description herein below, that the radios have unique IDs. In case of multiple agencies, the unique IDs of a radio can be a concatenation of one or more of a system ID, a radio ID, a color code, and a time slot. There is a unique synchronization pattern for each time slot which therefore helps a radio to identify the time slot ID, for example, as described in United States Patent Application Publication Number 20100086092 to Wiatrowski et al, entitled "Method Of Efficiently Synchronizing To A Desired Timeslot In A Time Division Multiple Access Communication System," published Apr. 8, 2010, assigned to the assignee of the present invention, which contents is herein incorporated by reference.

Each radio (radio "r") maintains the following sync information at time t:

$L_r(t)$: the ID of the radio which radio "r" thinks is the leader at time t. Note that radio "r" considers itself a leader if and only if $L_r(t)=ID_r$, where $ID_r$ is the ID of the radio "r". Also note that radio "r" may not have a leader at time t.

SyncAger(t): the time elapsed after radio "r" synced (directly or indirectly) with its leader, $L_r(t)$. It indicates how up-to-date the clock of radio "r" is with respect to clock of its leader. A radio starts a timer when it receives sync information from the leader. Radios exchange the timer value as part of the sync information. This field is used to control the drift of the radios' clock and for recovery from a leader's failure.

Timeslot boundaries: timeslot boundaries defined by the leader implicitly defined by the location of the sync word.

Figure 6:
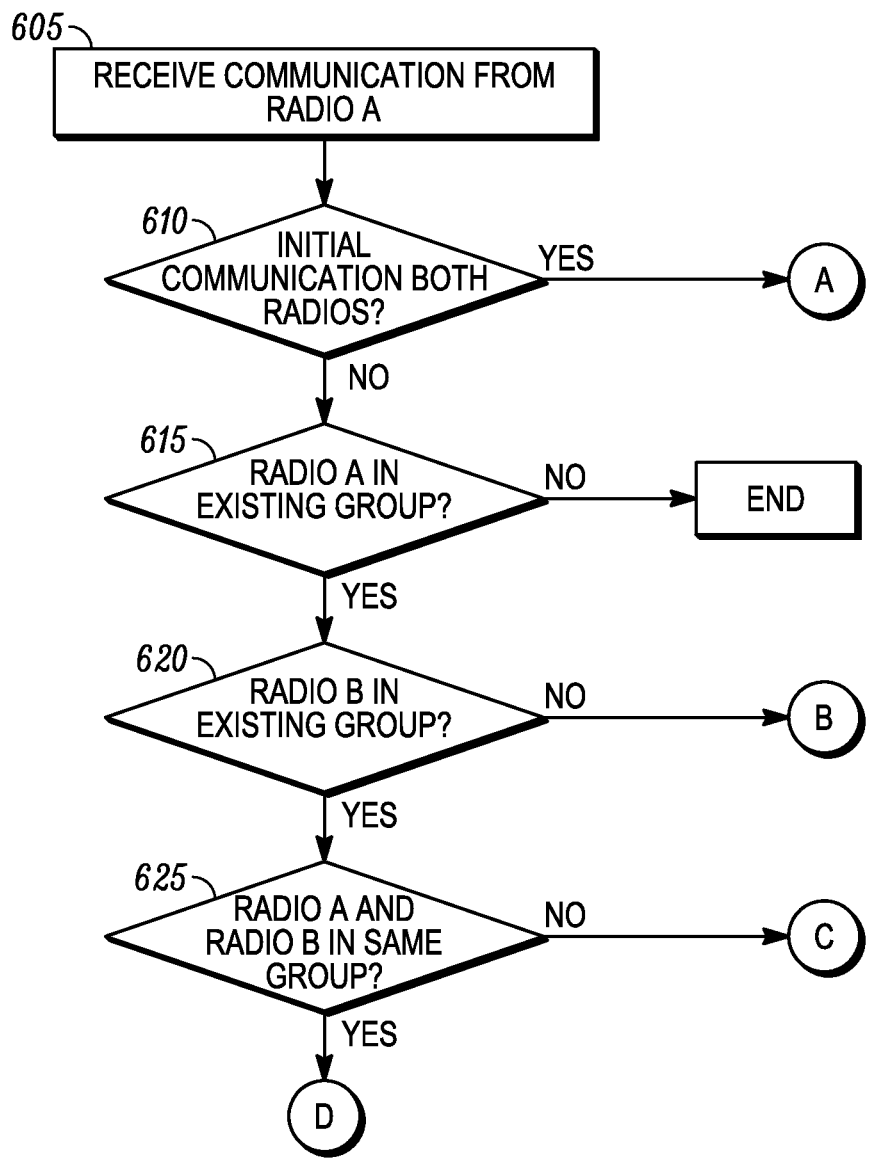
FIGS. 6, 7, 8, 9, and 10 are flowcharts illustrating various leadership determination operations within a radio in accordance with some embodiments.

FIG. 6 illustrates the general operation 600 of a radio B when receiving a communication from a radio A. It will be appreciated that the operation 600 is used whenever a radio B receives sync information from a neighbor radio A. As illustrated, in Step 605, radio B receives a communication from radio A. Next, in Step 610, radio B determines whether the received communication from radio A is the first communication by both radio A and radio B (i.e. initial condition). When it is an initial communication for both radios (i.e. neither radio A nor radio B has an identified leader radio), the operation continues to process A as illustrated further in FIG. 7.

Figure 7:
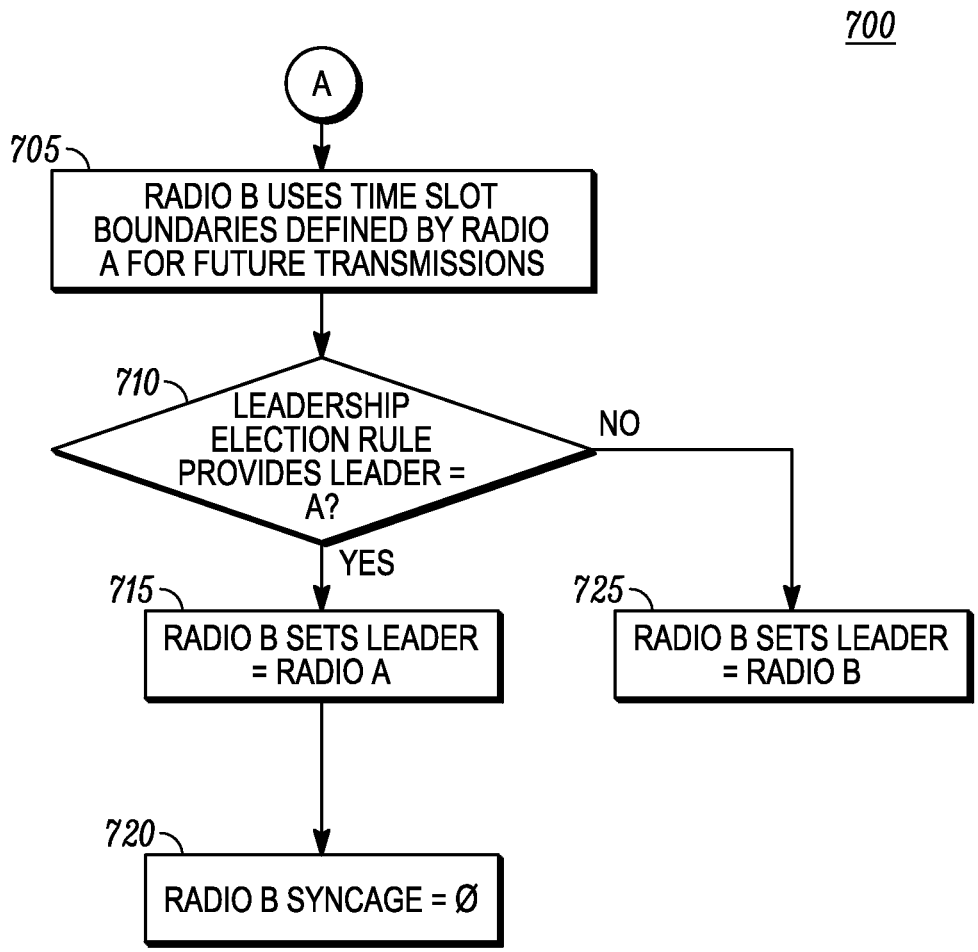

FIG. 7 illustrates a procedure 700 for radio B to identify a leader after receiving a communication from radio A. For example, the procedure 700 can be used by radio B when neither radio A nor radio B currently has an identified leader radio. As illustrated, starting with Step 705, radio B uses time slot boundaries defined by radio A for future transmissions. Radio B then utilizes the leadership election rule to identify its leader. In Step 710, radio B determines based on the leadership election rule whether radio A should be its leader. For example, when the leadership election rule comprises the radio with the highest radio ID being the leader, radio A would be selected as the leader when radio A's ID was greater than radio B's ID. When radio A is selected as the leader, the procedure continues to Step 715 in which radio B sets its leader as radio A. Next, in Step 720, radio B sets its synchronization age. In one embodiment, radio B utilizes a timer that increases over time, therefore, as illustrated, radio B sets its synchronization age to zero (SyncAge=0). In other words, a larger Sync Age indicates a longer time period has passed than a smaller Sync Age. In an alternative embodiment (not shown), radio B utilizes a timer that starts at a pre-determined time and counts down, therefore, radio B in the alternative embodiment would set its timer to the pre-determined time. A smaller Sync Age in the alternative embodiment would indicate a longer time period has passed than a larger Sync Age. When radio A is not the selected leader in Step 710, the procedure proceeds to Step 725 in which radio B sets itself as its leader (i.e. radio's B leader=radio B).

It will be appreciated by those of ordinary skill in the art, that upon completion of the process of FIG. 7, radio A may not have an identified leader radio. In one embodiment, (not shown), after selecting its leader radio, radio B sends a message to radio A informing radio A of radio B's selected leader and radio A can then evaluate this information and determine whether radio B's selected leader should also be radio A's selected leader.

Returning to FIG. 6, when the received communication is not the initial communication for both radio A and radio B in Step 610, the operation continues to Step 615 in which radio B determines whether radio A is a member of an existing radio group (i.e. a grouping of radios that are following the same leader). When radio A is not a member of an existing group, meaning it does not have a leader identified (and is using its own arbitrarily defined timeslot boundaries), the operation ends.

Returning to FIG. 6, when radio A is a member of an existing group in Step 615, the operation continues to Step 620 in which radio B determines whether or not it is a member of an existing group. When radio B is not a member of an existing group, meaning it does not have a leader identified, the operation continues to process B as illustrated further in FIG. 8.

Figure 8:
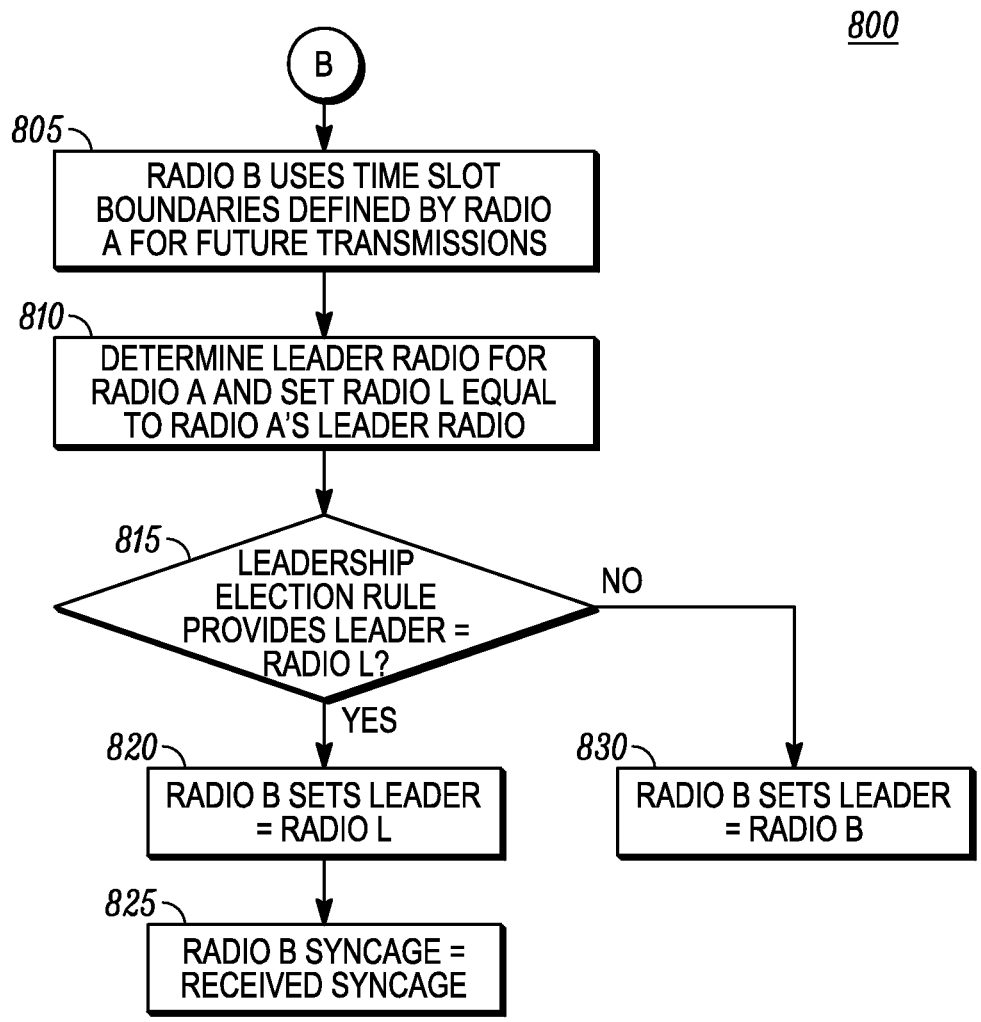

FIG. 8 illustrates a procedure 800 for radio B when radio B is not currently in a group but radio A is currently in a group. In this scenario, radio A is already in a group of radios that is converged and in agreement on a leader. Radio B, for example, turns on and doesn't know any leader (radio B may assume that radio B is the leader) and doesn't know the channel timing. Alternatively, radio B can have selected itself as its leader previously. In the procedure 800, radio B, therefore, joins the existing group in which A is a member. As illustrated, the procedure 800 begins with Step 805 in which radio B uses time slot boundaries defined by radio A for future transmissions. Next, in Step 810, radio B determines the leader radio for radio A and sets radio L equal to radio A's leader radio. For example, radio A can send its leader radio ID and/or other information as part of the synchronization information sent to radio B. Alternatively, radio B can request and radio A can respond with its leader radio ID and/or other information. It will be appreciated that radio B can alternatively store information (for example, color code, time slot) regarding the various radios within the system and receive only the leader radio's ID from radio A. Next, in Step 815, radio B utilizes the leadership election rule to identify its leader. In Step 815, radio B determines based on the leadership election rule whether radio L (i.e. radio A's current leader) is its leader. For example, when the leadership election rule comprises the radio with the highest radio ID being the leader, radio L would be selected as the leader when radio L's ID was greater than radio B's ID. When radio L is selected as the leader, the procedure continues to Step 820 in which radio B sets its leader as radio L. Next, in Step 825, radio B sets its SyncAge to the received SyncAge from radio A. When radio L is not identified as radio B's leader in Step 815, the procedure continues to Step 830 in which radio B sets itself as its leader.

In one embodiment, (not shown), after selecting its leader radio, radio B sends a message to radio A informing radio A of radio B's selected leader.

Returning to FIG. 6, when radio B is a member of an existing group in Step 620, the operation continues to Step 625 in which radio B determines whether radio A and radio B are members of the same group. When radio A and radio B are not members of the same group, the operation continues to process C as illustrated further in FIG. 9.

Figure 9:
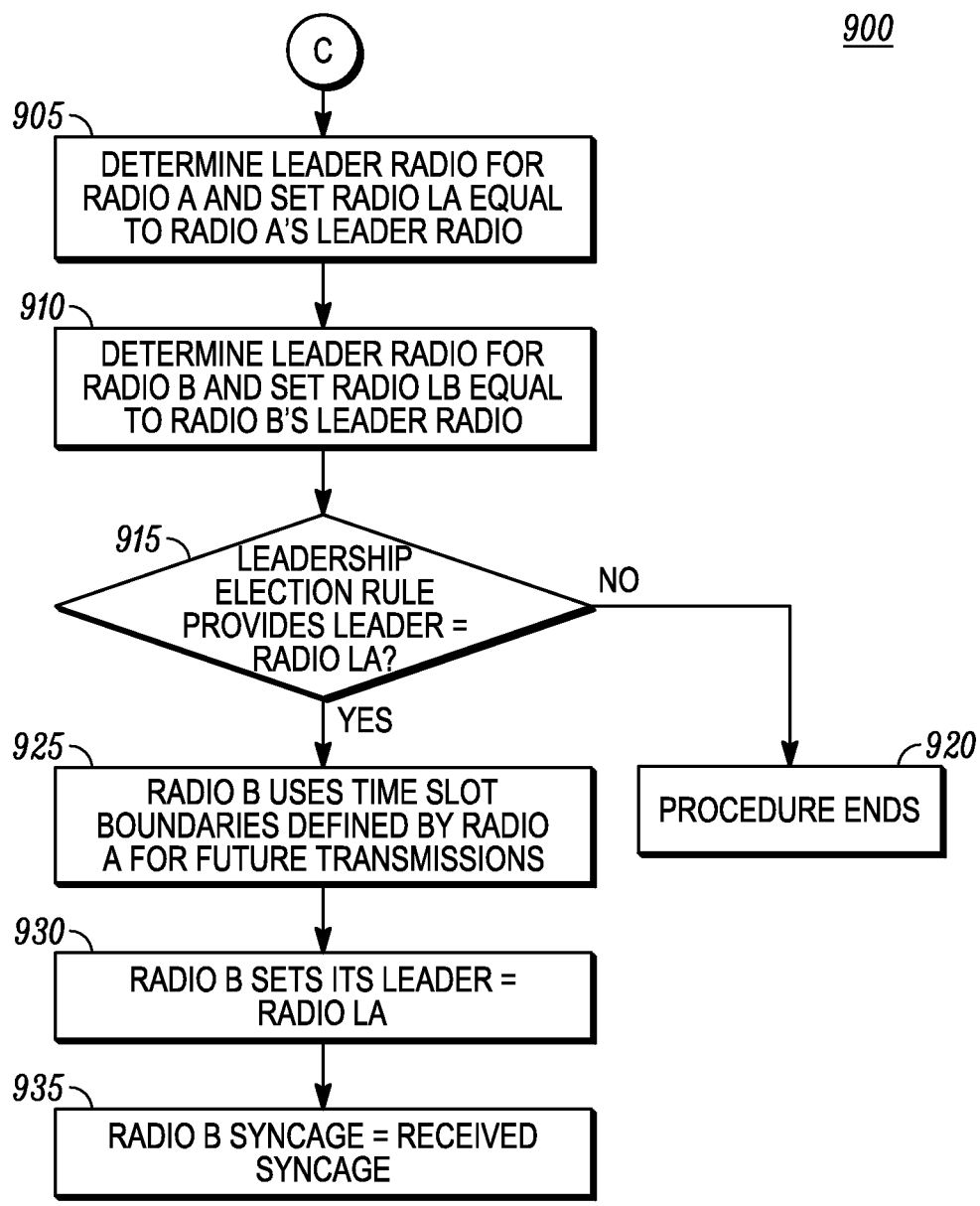

As illustrated in the procedure 900 of FIG. 9, when radio A and radio B are not members of the same group (i.e. not following the same leader), the groups can merge to allow the members of the two groups to follow the same leader. At Step 905, radio B determines the leader radio for radio A and sets radio LA equal to radio A's leader radio. Next, in Step 910, radio B determines its own leader radio sets radio LB equal to radio B's leader radio. Next, in Step 915, radio B utilizes the leadership election rule to identify its leader. In Step 915, radio B determines based on the leadership election rule whether radio LA (i.e. radio A's current leader) is its leader. For example, when the leadership election rule comprises the radio with the highest radio ID being the leader, radio LA would be selected as the leader when radio LA's ID was greater than radio LB's ID. When radio LA is not selected as the leader, the procedure ends at Step 920. When radio LA is selected as radio B's leader, the procedure continues to Step 925 in which radio B uses time slot boundaries defined by radio A for future transmissions. Next, in Step 930, radio B sets its leader to radio A's leader (i.e. radio LA). Next, in Step 935, radio B sets its SyncAge to the received SyncAge from radio A.

It will be appreciated that, in one embodiment, (not shown), when radio B does not select radio LA as its new leader, radio B can send a message to radio A identifying its current leader as radio LB.

Figure 10:
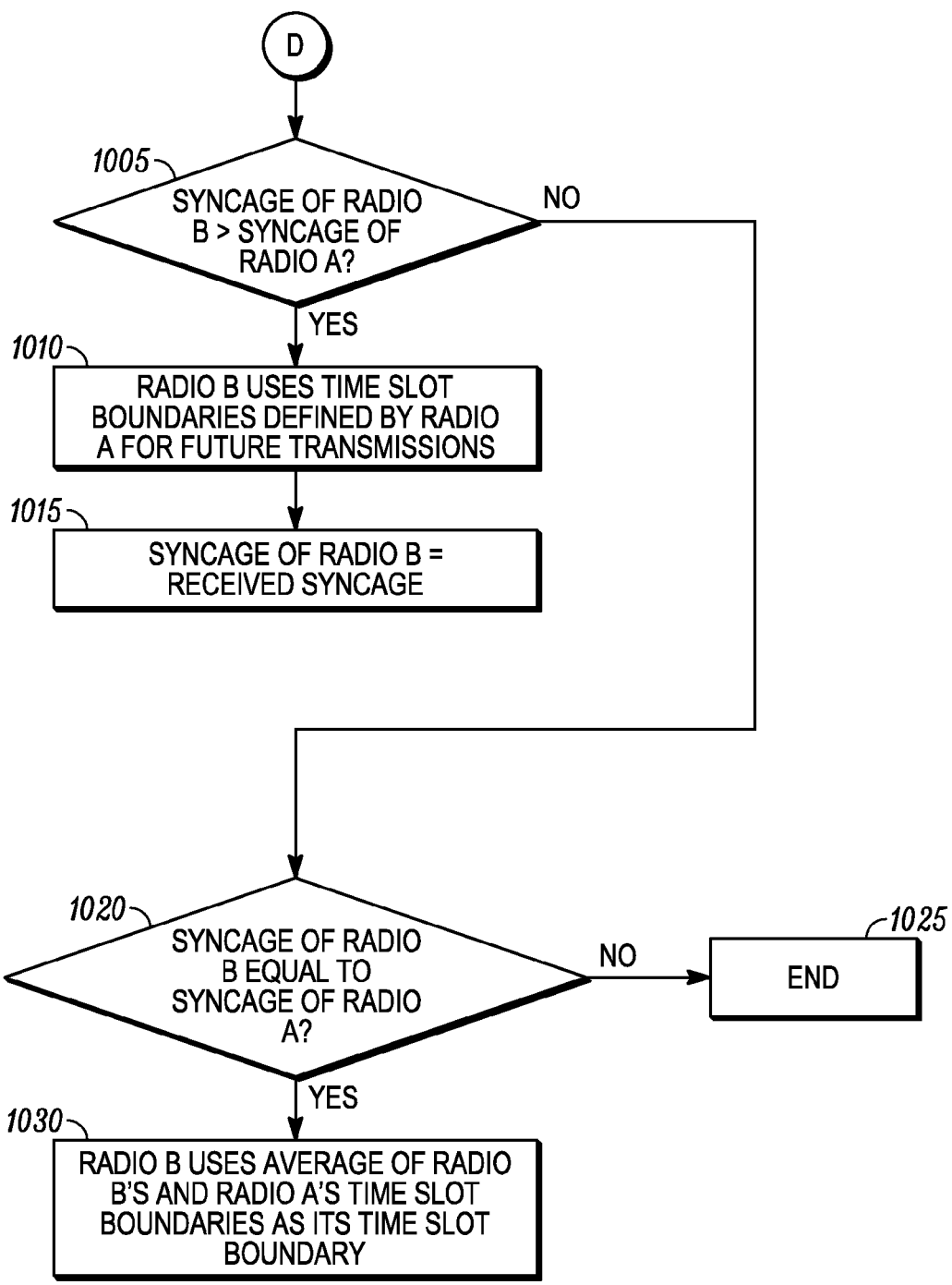

Returning to FIG. 6, when radio A and radio B are members of the same group (i.e. are following the same leader) in Step 625, the operation continues to process D as illustrated in the procedure 1000 of FIG. 10, in which drift control is implemented. Drift may occur as a result of time base reference oscillator errors between radios (i.e., one clock may be slightly faster or slower than another when left free-running without synchronization). For illustrative purposes only, the operation illustrated in FIG. 10 utilizes an embodiment in which the radios operate utilizing a timer that increases over time. In other words, a larger Sync Age indicates a longer time period has passed than a smaller Sync Age. In an alternative embodiment (not shown), the radios operate utilizing a timer that starts at a pre-determined time and counts down. A smaller Sync Age in the alternative embodiment would indicate a longer time period has passed than a larger Sync Age.

As illustrated in FIG. 10, At Step 1005, radio B determines whether or not its SyncAge is greater than the SyncAge received from radio A. When the SyncAge of radio B is greater than the SyncAge of radio A, the procedure continues to Step 1010 in which radio B uses time slot boundaries defined by radio A for future transmissions. Next, in Step 1015, radio B sets its SyncAge to the received SyncAge of radio A. When radio B's SyncAge is not greater than radio A's SyncAge in Step 1005, the procedure continues to Step 1020 in which radio B determines whether its SyncAge is equal to radio A's. When it is not, the procedure ends at Step 1025. When its SyncAge is equal to radio A's, the procedure continues to Step 1030 in which radio B averages its time slot boundaries and radio A's time slot boundaries, and uses the averaged time slot boundary value as its time slot boundary.

Current Leader Failure

Figure 11:
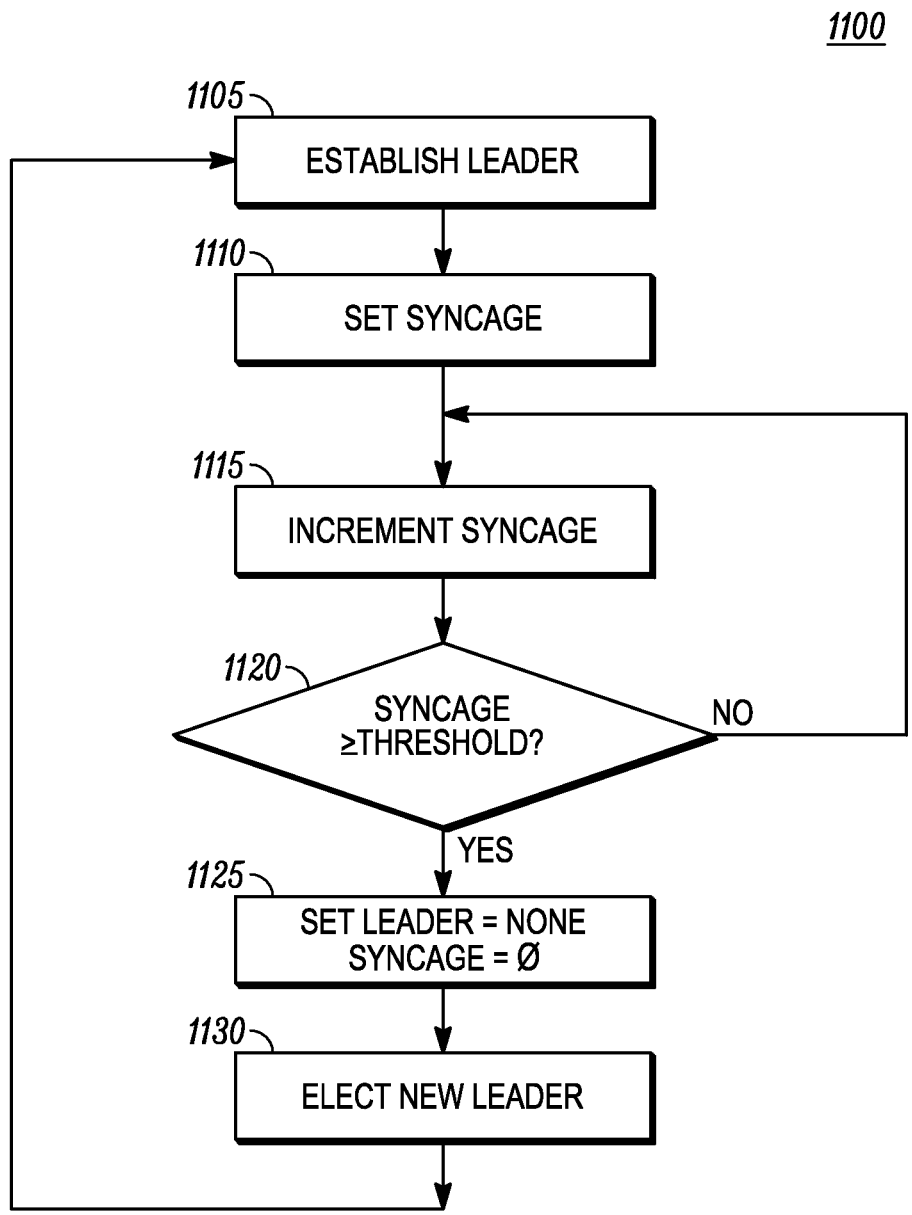
FIG. 11 is a flowchart illustrating the operation of a radio in detecting and responding to a current leader failure in accordance with some embodiments.

FIG. 11 is a flowchart illustrating the operation 1100 of a radio in detecting and responding to a current leader failure in accordance with some embodiments. A leader may be considered to be failed if it is no longer in communication with any other radio in the system. This could occur, for example, when the radio is switched off by the user, when the radio roams out of range from every other radio, or when the radio is tuned to a different channel by the user.

For illustrative purposes only, the operation illustrated in FIG. 11 utilizes an embodiment in which the radios operate utilizing a timer that increases over time. In other words, a larger Sync Age indicates a longer time period has passed than a smaller Sync Age. In an alternative embodiment (not shown), the radios operate utilizing a timer that starts at a pre-determined time and counts down. A smaller Sync Age in the alternative embodiment would indicate a longer time period has passed than a larger Sync Age.

As illustrated, in Step 1105, the radio establishes its leader, for example, as described and illustrated previously herein in FIGS. 6-10. Next, in Step 1110, the radio sets SyncAge for the leader. For example, when a radio first establishes contact with the leader, it starts a timer (i.e. SyncAge). When the radio passes the sync information to another radio, it also passes its "SyncAge". Therefore, the SyncAge can be set either to zero (initial direct contact with the leader) or to a received SyncAge (initial indirect contact with the leader). Next, in Step 1115, the radio maintains the SyncAge by incrementing it after elapse of a predetermined unit time. Next, in Step 1120, the radio determines whether the current SyncAge has reached or exceeded a threshold value (for example 'T' minutes). When the SyncAge has not reached the threshold, the radio operation cycles back to Step 1115 and periodically increments SyncAge. When the SyncAge is greater than or equal to the threshold, the radio assumes that the leader has failed. In other words, a radio presumes that the current leader has failed if the sync received (i.e. in Step 1110) (directly or indirectly) by the radio from the leader and periodically incremented (i.e. in Step 1115) is older than a threshold. Thereafter, in Step 1125, the radio sets its leader as "None" and SyncAge is reset to 0. Next, in Step 1130, the radio starts participating in the process of electing a new leader. The operation then cycles back to Step 1105 when a new leader for the radio has been established.

It will be appreciated by those of ordinary skill in the art that the SyncAges of all the radios will not cross the threshold at the same time due to independent clocks of the radios and transfer of SyncAges from one radio to another.

Convergence

To keep the drift within a limit and for faster convergence, the leader periodically broadcasts a beacon containing its sync information. All the radios that receive the beacon, sync with the beacon and restart their SyncAge timer.

The beacon, in accordance with some embodiments, comprises at least a Sync Age, a Leader ID, a System ID, and a Radio ID. For example, within a Control Signaling Block (CSBK) structure as defined by the ETSI DMR standard, the eight (8) octets of CSBK Data including Sync Age, Leader ID, System ID, and Radio ID are added.

In accordance with some embodiments, the additional fields of Sync Age, Leader ID, System ID, and Radio ID are included in transmissions sent by each subscriber when exchanging synchronization information. For example, the information can be included at the end of a transmission (i.e. end of voice transmissions, end of data transmissions, and/or end of CSBK transmissions) or can be exchanged as a standalone transmission of synchronization information. When a radio sees a message with an older sync, then the radio performs a random delay. When, during the random delay, no other radio broadcasts sync information, which is equivalent to its sync information, the radio broadcasts its own sync information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for synchronizing direct mode time division multiple access (TDMA) transmissions among a plurality of radios, the method comprising:
   receiving, by a first radio, direct mode RF transmissions from a second radio defining time slot boundaries being used by the second radio;
   determining, by the first radio, using information received in the RF transmissions from the second radio, that a timing leader radio being used by the second radio and a timing leader radio being used by the first radio are the same;
   responsive to determining that the timing leader radio being used by the second radio and a timing leader radio being used by the first radio are the same:
   identifying, using the information received in the RF transmission from the second radio, a second synchronization age of the second radio;
   determining, by the first radio, whether a first synchronization age of the first radio indicates a longer time period has passed since synchronization with the timing leader radio than as indicated by the second synchronization age; and
   responsive to determining that the first synchronization age of the first radio indicates a longer time period has passed than as indicated by the second synchronization age:
   synchronizing, by the first radio, a time slot boundary of the first radio with a time slot boundary of the second radio; and
   setting, by the first radio, a value of the first synchronization age of the first radio equal to a value of the second synchronization age of the second radio.

2. The method as claimed in claim 1, wherein each radio of the plurality of radios is preprogrammed with a leadership election rule.

3. The method as claimed in claim 2, wherein the leadership election rule is selected from a group comprising selecting a radio with a highest identification as the leader, selecting a radio with a lowest identification as the leader, selecting a radio with a preferred provisioned leader priority attribute as the leader, selecting a radio as the leader based at least in part on one or more of a radio identification, a provisioned color code, and a provisioned time slot.

4. The method as claimed in claim 3, wherein each of the radio identifications comprise a concatenation of one or more of a system identification, a radio identification, a color code, and a time slot.

5. The method as claimed in claim 2, wherein the leadership election rule comprises selecting a radio with a preferred provisioned leader priority attribute as the leader, wherein the plurality of radios comprise one or more stationary radios and one or more mobile radios, and further wherein the leader priority attribute is set to a preferred level for the one or more stationary radios and to a non-preferred level for the one or more mobile radios.

6. The method as claimed in claim 1, further comprising when the synchronization age of the first radio is equal to the synchronization age of the second radio:
   operating the first radio to:
   average a time slot boundary of the first radio and a time slot boundary of the second radio to calculate an averaged time slot boundary value, and
   set a time slot boundary of the first radio to the averaged time slot boundary value.

7. The method as claimed in claim 1, further comprising:
   periodically updating the first synchronization age of the leader to indicate an elapsed unit of time after the elapse of the unit of time; and
   clearing the leader and resetting the first synchronization age when the first synchronization age reaches a threshold.

8. The method as claimed in claim 7, further comprising:
   repeating the determining, synchronizing, and setting steps after the clearing and resetting steps.

9. The method as claimed in claim 1, further comprising:
   periodically broadcasting, by the leader, a beacon containing synchronization information; and
   synchronizing, by the first radio, with the beacon including resetting a value of the first synchronization age.

10. The method as claimed in claim 1, further comprising:
performing a random delay, by the first radio, when the first radio receives a message with an older synchronization age than the first synchronization age stored in the first radio; and
broadcasting, by the first radio, synchronization information including the stored first synchronization age when no other radio broadcasts a synchronization information during the random delay.

11. A non-transitory computer readable medium having instructions stored thereon that, responsive to execution by a computing device, cause the computing device to perform a set of functions including:
receiving direct mode RF transmissions from an other radio defining time slot boundaries being used by the other radio;
determining, using information received in the RF transmission from the other radio, that a timing leader radio being used by the other radio and a timing leader radio being used by the computing device are the same;
responsive to determining that the timing leader radio being used by the other radio and a timing leader radio being used by the computing device are the same:
identifying, using the information received in the RF transmissions from the second radio, a second synchronization age of the second radio;
determining whether a first synchronization age of the computing device indicates a longer time period has passed since synchronization with the timing leader radio than as indicated by the second synchronization age; and
responsive to determining that the first synchronization age of the computing device indicates a longer time period has passed than as indicated by the second synchronization age:
synchronizing a time slot boundary of the computing device with a time slot boundary of the other radio; and
setting a value of the first synchronization age of the computing device equal to a value of the second synchronization age of the second radio.

12. The non-transitory computer readable medium as claimed in claim 11, the set of functions further comprising, when the synchronization age of the first radio is equal to the synchronization age of the second radio:
average a time slot boundary of the first radio and a time slot boundary of the second radio to calculate an averaged time slot boundary value, and
set a time slot boundary of the first radio to the averaged time slot boundary value.

13. The non-transitory computer readable medium as claimed in claim 11, the set of functions further comprising:
performing a random delay when the first radio receives a message with an older synchronization age than the first synchronization age stored in the first radio; and
broadcasting synchronization information including the stored first synchronization age when no other radio broadcasts a synchronization information during the random delay.

* * * * *